(12) United States Patent
Strom (10) Patent No.: US 8,052,360 B2
(45) Date of Patent: Nov. 8, 2011

(54) SELF-ALIGNING THREAD TAP AND METHOD OF UTILIZING THE SAME TO TAP EXISTING BORE HOLES

(76) Inventor: Carl Strom, Topanga, CA (US)

(*) Notice: Subject to any disclaimer, the term of this patent is extended or adjusted under 35 U.S.C. 154(b) by 0 days.

(21) Appl. No.: 12/877,975

(22) Filed: Sep. 8, 2010

(65) Prior Publication Data

US 2010/0329803 A1 Dec. 30, 2010

Related U.S. Application Data

(63) Continuation-in-part of application No. 11/982,067, filed on Oct. 31, 2007, now Pat. No. 7,819,613.

(51) Int. Cl.
*B23G 5/06* (2006.01)
(52) U.S. Cl. ......................... 408/222; 408/1 R
(58) Field of Classification Search .................. 408/222, 408/215, 219; 470/198; *B23G 5/06*
See application file for complete search history.

(56) References Cited

U.S. PATENT DOCUMENTS

| | | | |
|---|---|---|---|
| 1,949,618 A | | 3/1934 | Molberg |
| 2,795,221 A | | 6/1957 | Braendel |
| 2,922,455 A | | 1/1960 | Braendel |
| 3,167,860 A | * | 2/1965 | Welles, Jr. et al. .............. 72/362 |
| 3,260,150 A | | 7/1966 | Colman |
| 3,402,613 A | | 9/1968 | Neusel et al. |
| 3,405,596 A | | 10/1968 | Nauschotz |

(Continued)

FOREIGN PATENT DOCUMENTS

DE 3307555 A1 * 9/1984

(Continued)

OTHER PUBLICATIONS

Garserts Catalog, dated Jul. 23, 2008, obtained from www.gardspecialists.com website Aug. 2010, copy enclosed.

*Primary Examiner* — Eric A Gates
(74) *Attorney, Agent, or Firm* — James M. Duncan, Esq.; Klein, DeNatale, Goldner et al.

(57) ABSTRACT

A self-aligning tap is used to produce correctly aligned new threads in an existing smooth bore hole. The design of the tap's shank, flutes, and cutting surfaces is that of commonly used existing taps. The flat end of the tap—the end that enters the existing bore hole—contains a threaded bore. A removable pilot that aligns the tap to the axis of the existing bore consists of a cylindrical body with a diameter slightly smaller than the existing bore hole, and a length no greater than the diameter of the major diameter of the tap. The upper end of the cylindrical pilot—the end that shoulders against the tap—comprises a threaded stem whose thread pitch matches that of the tap end's bore, and whose length is slightly less than the tap end bore's depth. Once the cylindrical pilot's stem is threaded into the tap end's bore and the resulting assembly is placed into the existing bore hole, it serves to align the tap so that its cutting teeth produce pilot threads which are accurately aligned to the existing bore hole's axis. Once the pilot threads have been produced by rotation of the tap, the tap may be removed from the existing bore hole, the pilot detached by unscrewing it, and the tap reinserted into the newly formed pilot threads. Further rotation of the tap completes the tapping operation of the existing bore hole to the desired depth.

19 Claims, 9 Drawing Sheets

U.S. PATENT DOCUMENTS

| | | | |
|---|---|---|---|
| 3,430,531 | A | 3/1969 | Bosse |
| 3,597,781 | A | 8/1971 | Eibes et al. |
| 3,662,643 | A | 5/1972 | Scheffer |
| 3,866,509 | A | 2/1975 | Kraus et al. |
| 4,097,061 | A | 6/1978 | Dietlein |
| 4,601,625 | A | 7/1986 | Ernst et al. |
| 4,730,968 | A | 3/1988 | Diperstein et al. |
| 5,000,638 | A | 3/1991 | Essom et al. |
| 5,131,795 | A | 7/1992 | Kobusch |
| 5,211,520 | A | 5/1993 | McKinney |
| 5,547,323 | A | 8/1996 | Fang |
| 5,549,431 | A | 8/1996 | Royle |
| 5,562,371 | A * | 10/1996 | Reed ............................ 408/222 |
| 5,755,542 | A | 5/1998 | Janusz et al. |
| 6,261,039 | B1 | 7/2001 | Reed |
| 6,382,893 | B1 | 5/2002 | Reed |
| 6,435,788 | B2 | 8/2002 | Reed |
| 6,511,267 | B2 * | 1/2003 | Slaughter ...................... 408/1 R |
| 6,530,731 | B2 | 3/2003 | Wheeler |
| 6,685,573 | B2 * | 2/2004 | Hikosaka et al. ............. 470/204 |
| 7,140,825 | B2 | 11/2006 | Takahashi et al. |
| 7,322,978 | B2 | 1/2008 | West, Jr. |
| 2002/0131843 | A1 | 9/2002 | Chen-Chi et al. |
| 2004/0136807 | A1 | 7/2004 | Foerster, Jr. |
| 2006/0013671 | A1 | 1/2006 | Lauderbaugh |
| 2006/0115345 | A1 | 6/2006 | Mardinger et al. |
| 2007/0053763 | A1 | 3/2007 | Allaart et al. |
| 2007/0053764 | A1 | 3/2007 | Gahler et al. |

FOREIGN PATENT DOCUMENTS

| | | | |
|---|---|---|---|
| DE | 10227687 | A1 * | 1/2004 |
| GB | 287327 | * | 3/1928 |

* cited by examiner

SELF-ALIGNING THREAD TAP AND METHOD OF UTILIZING THE SAME TO TAP EXISTING BORE HOLES

CROSS-REFERENCE TO RELATED APPLICATION

This is a continuation-in-part application of U.S. application Ser. No. 11/982,067 which was filed on Oct. 31, 2007 to which application this inventor claims domestic priority.

BACKGROUND OF THE INVENTION

The present invention generally relates to taps and threaded workpieces, and more particularly to producing correctly aligned threads in various metals, plastics, etc. within existing smooth bores. The parent application to the present application concerns self-tapping and self-aligning thread-replacement inserts.

When creating new threads in an existing smooth bore by means of a tap, it is obviously desirable that the new threads be correctly aligned to the axis of the bore hole. For example, if the tap enters the bore crookedly, it may bind or break, and, if it does not break but does produce crooked threads, then the crooked threads may cause misalignment of the threaded bore with the fastener and with the part secured by the fastener to the workpiece. The present invention addresses this alignment problem by modifying existing tap designs so that a pilot may be attached to and detached from the tap, to ensure that: 1) the tap enters the smooth bore straight; 2) the tap creates pilot threads accurately aligned to the smooth bore's axis; and 3) once the pilot threads have been created, that the pilot may be detached from the tap, and the tap reinserted into the newly formed pilot threads so that the smooth bore may be tapped fully through or to its bottom.

In machine shop and in industrial maintenance shop settings, the accurate tapping of holes is not normally problematic, in that power equipment such as mills and drill presses can be used to secure and position the workpiece, to properly align the tap to the workpiece by means of a chuck, collet, etc., and even to rotate the tap. However, in field settings, outside such well equipped shops, the tapping operation is usually done by hand, using a tap handle or similar device to rotate the tap. In such field settings, correct alignment of the tap to the smooth bore is often problematic. In order to start the tap straight and maintain its alignment, the operator normally relies on his eye alone, or sometimes uses assistants ("spotters") stationed to one or more sides of the workpiece to aid with the alignment of the tap. Known ways of increasing the chance that the tap's axis will match that of the smooth bore include: 1) hand-held tap guides, of a bushing-type design, which are positioned over the bore and held in place with one hand, while the operator's other hand, or an assistant, rotates the tap handle; 2) Bushing-type guides positioned over the bore hole and clamped or otherwise attached to the surface of the workpiece; 3) Taps with integral guides, whose integral guide is inserted into the bore hole to guide the tap, after which, especially when it is a blind hole that is being tapped, a second tap of the same thread pitch but without an integral guide is used to complete the tapping operation.

The disadvantages of the currently known tapping aids are: 1) Hand-held tap guides are only as accurate as the operator's skill, attentiveness, and site conditions allow. Larger diameter taps, which require high torque and larger tap handles to install, are unsuited to the use of hand-held tap guides. 2) Tap guide fixtures that attach to the workpiece are cumbersome to operate, are time-consuming to install, and are limited by space constraints and suitable attachment surfaces. 3) Both 1 and 2 above are ineffective on uneven or curved surfaces. 4) Taps with integral guides cannot create new threads all the way to the bottom of a "blind" hole, because the tap's pilot area bottoms the tap out before the tapping operation is complete, such that a second tap, without a guide, is needed to finish the job. A disadvantage of conventional (non-guided) taps is that, due to the difficulty of starting them straight, conventional taps are manufactured in three versions: a starter (taper) tap, an intermediate (plug) tap, and a finishing (bottoming) tap.

A need therefore exists, particularly under field conditions, for a tap which consistently aligns itself to the axis of the bore hole, regardless of the workpiece's shape or surface condition; which does so without the aid of any hand-held apparatus or apparatus attached to the workpiece and without the limitations of an integral-guide tap, and which eliminates the risks associated with measuring alignment "by eye."

SUMMARY OF THE INVENTION

The present invention is directed to embodiments of a self-aligning tap which meets one or more of the needs identified above. The disclosed self-aligning tap is utilized to provide consistent accurately aligned threads within the smooth bore(s) of a workpiece. An embodiment of the present invention comprises an improved thread tap, wherein the improvement comprises a pilot member which removably attaches to the front of the tap member, thus self-aligning the thread tap as the first few threads in the bore hole are cut. When sufficient threads are cut to retain the tap member in an aligned position, the thread tap is withdrawn, the pilot member removed, and the tap member reinserted for completion of the threads in the bore hole. The invention further comprises a method of utilizing embodiments of the disclosed improved thread tap.

DETAILED DESCRIPTION OF THE EMBODIMENTS

Figure 1:
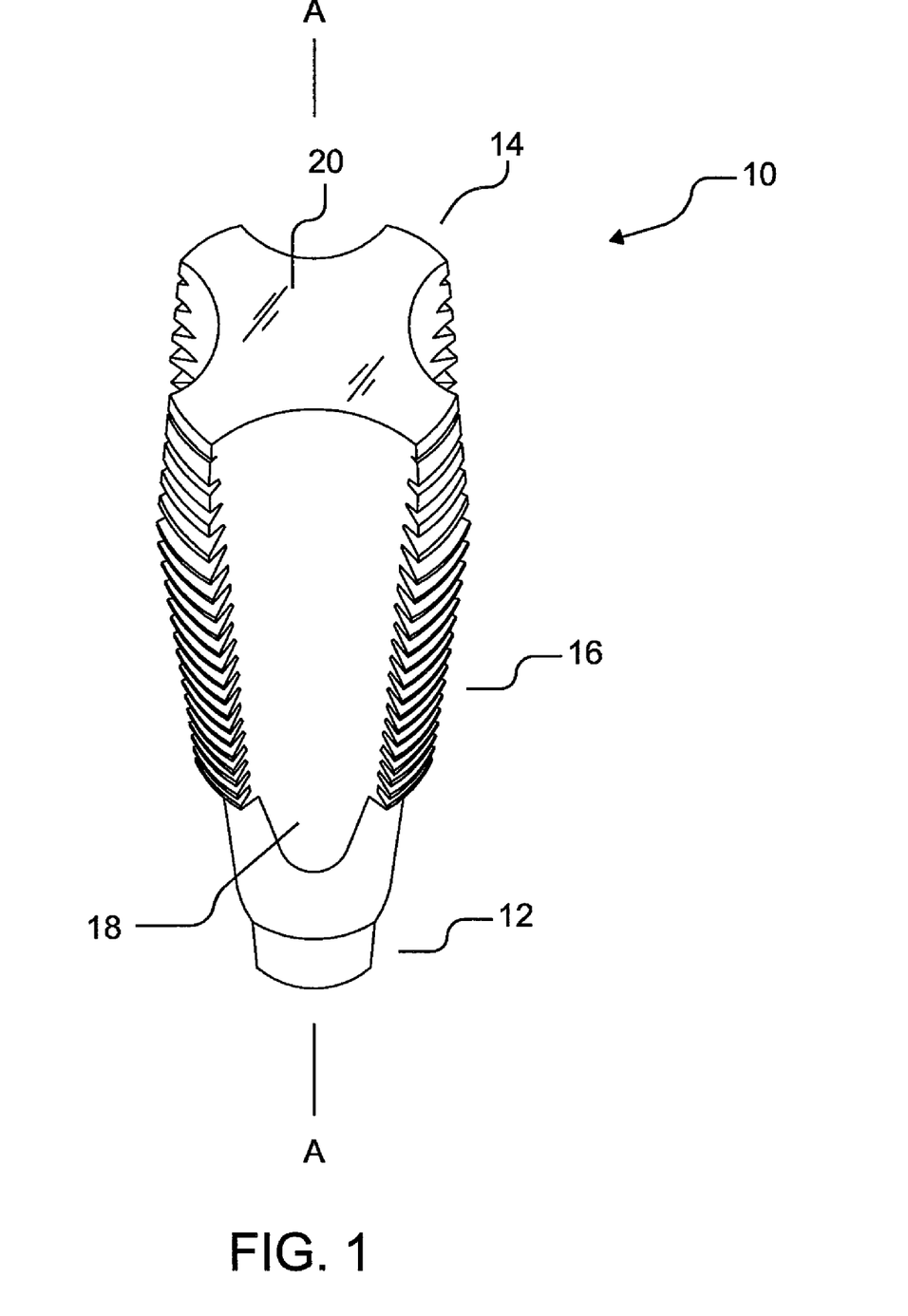
FIG. 1 is a perspective view of a prior art thread tap.
Figure 2:
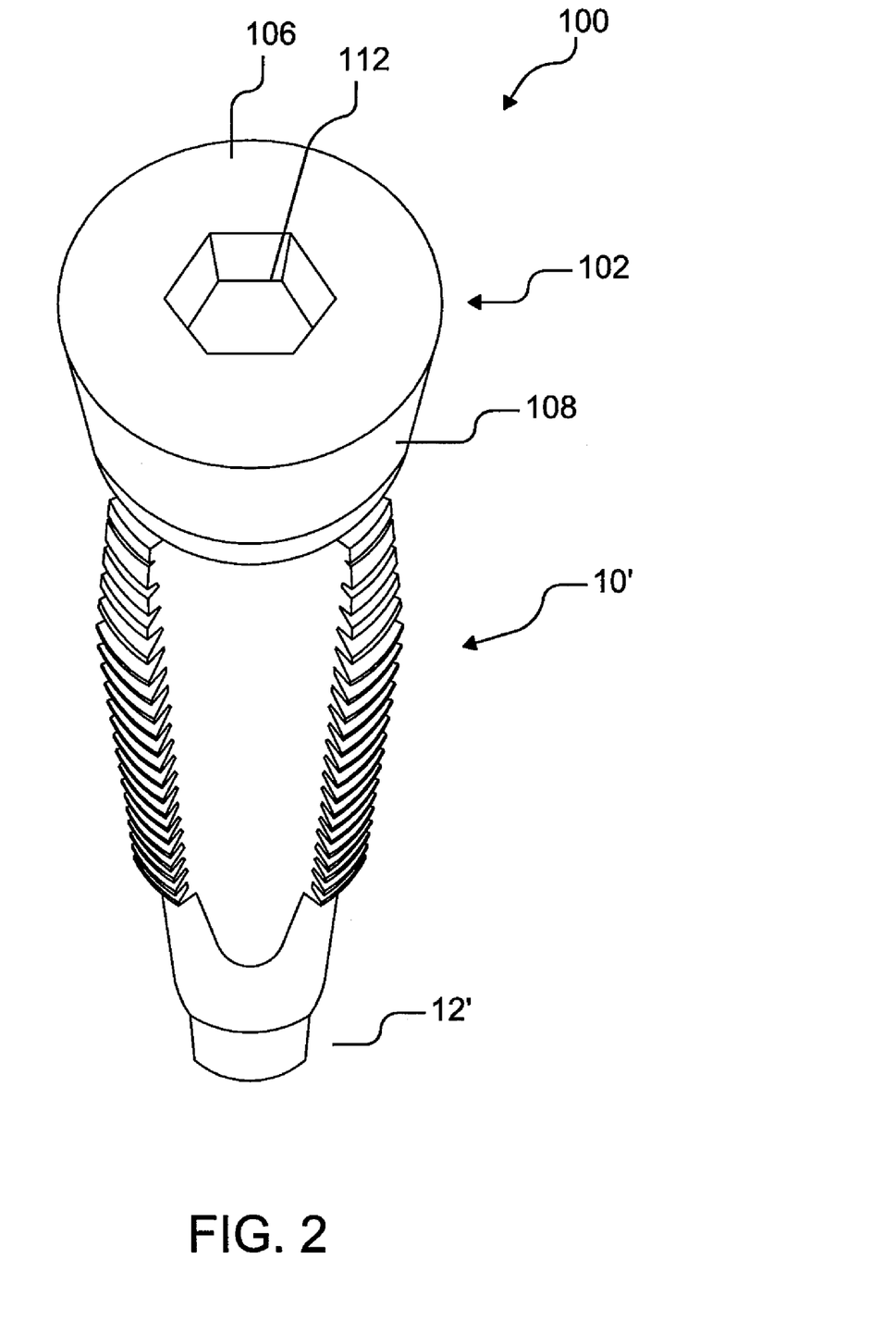
FIG. 2 is a perspective view of an embodiment of the presently disclosed self aligning thread tap, viewed from the end to which the detachable guide is attached.

Referring now to the figures, a prior art thread tap 10 is shown in FIG. 1. The standard tap comprises a shank having a first end 12 adapted for engagement by a rotation means, such as a hand tool, and a second end 14 (the "working end") for introduction into a smooth bore of a work piece 1. Between these two ends, the standard tap comprises a threaded portion 16 and fluted shaft portion 18, the shaft having a substantially uniform diameter, tapering towards its working end 14. As shown in FIG. 1, the threaded portion 16 and fluted shaft portion 18 may comprise a plurality of generally axially aligned and outwardly extending lobe members, where each lobe member has a face comprising cutting threads, wherein each pair of adjacent lobe members is divided by a flute section 18. The standard tap further comprises a shaft terminus 20, which typically is a flat surface perpendicular to the central axis A of the shaft.

It is to be noted that while the present invention comprises an improvement of the prior art tap, embodiments of the present invention are not dependent upon any single combination of flute design and/or thread design in the prior art tap's shaft, but rather apply to all thread and flute configurations, including but not limited to straight-flute taps, spiral-flute taps, 3-flute taps, 4-flute taps, coarse threads, fine threads, metric threads, tapered/mating threads, left-handed threads, right-handed threads, and so forth. As referenced below, the prior art tap described in this paragraph and illustratively shown in FIG. 1 is hereinafter referred to as the tap member 10' of the present invention.

Figure 3:
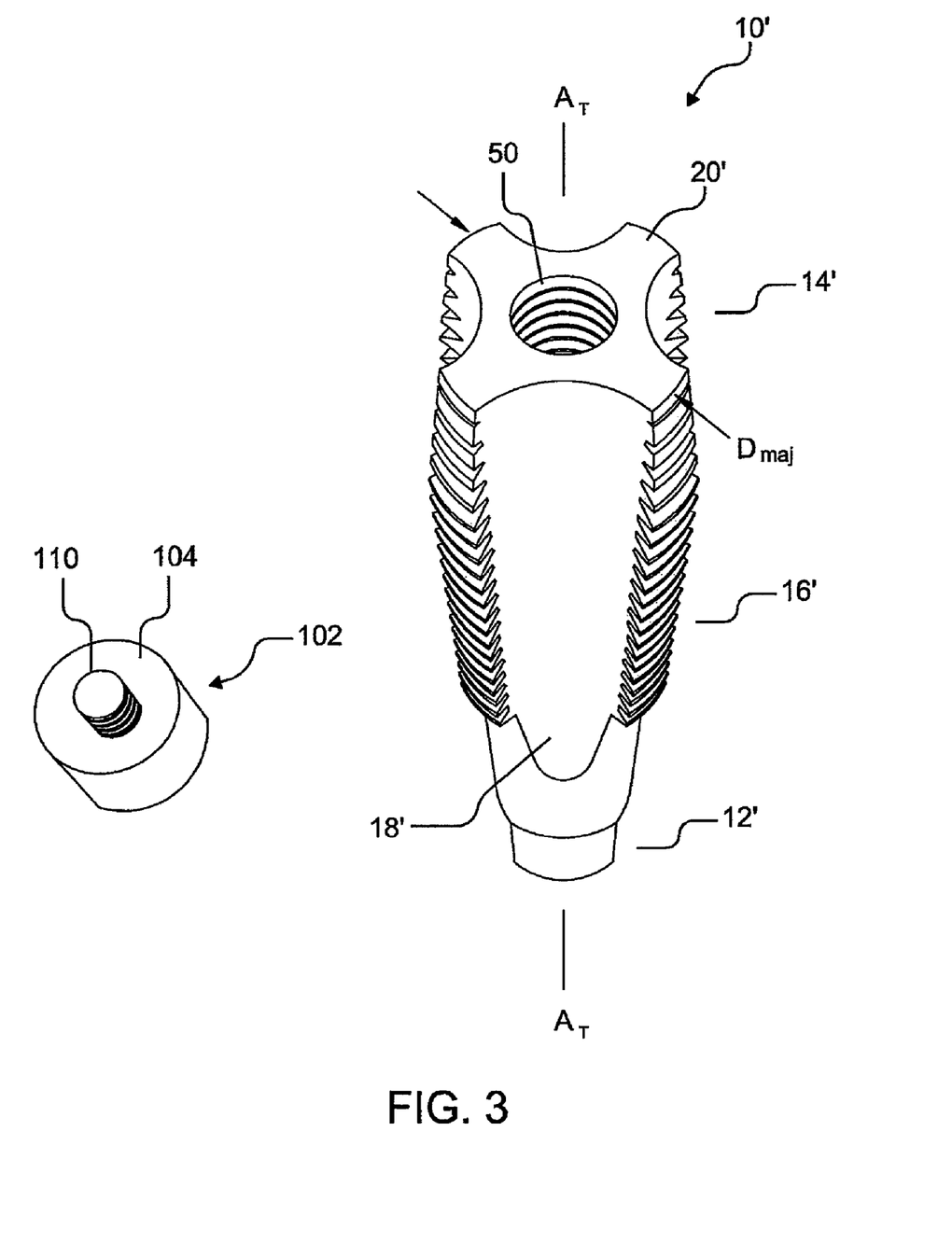
FIG. 3 is a perspective view of the embodiment of the disclosed self aligning thread tap of FIG. 2, with the detachable guide removed and placed to the side of the tap member.
Figure 4:
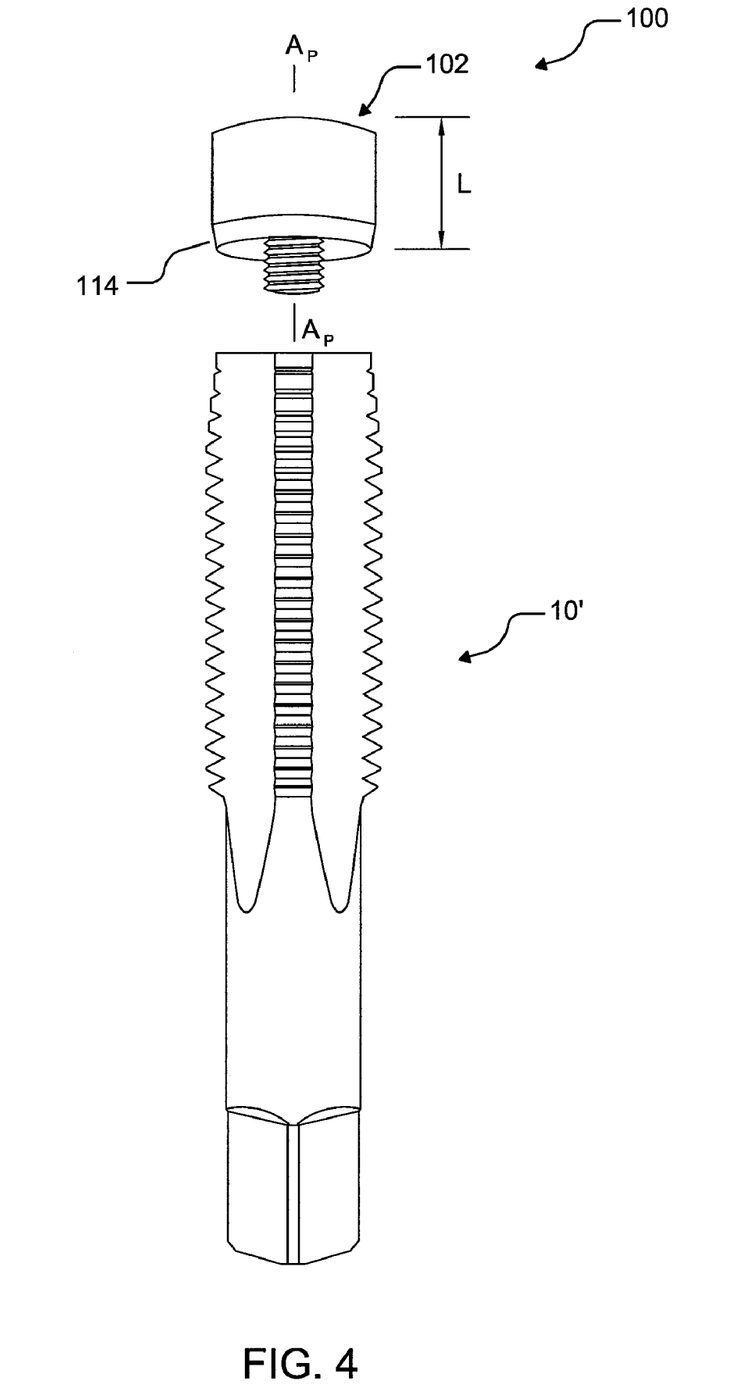
FIG. 4 is an exploded view of the embodiment of the self-aligning thread tap shown in FIG. 2.
Figure 5:
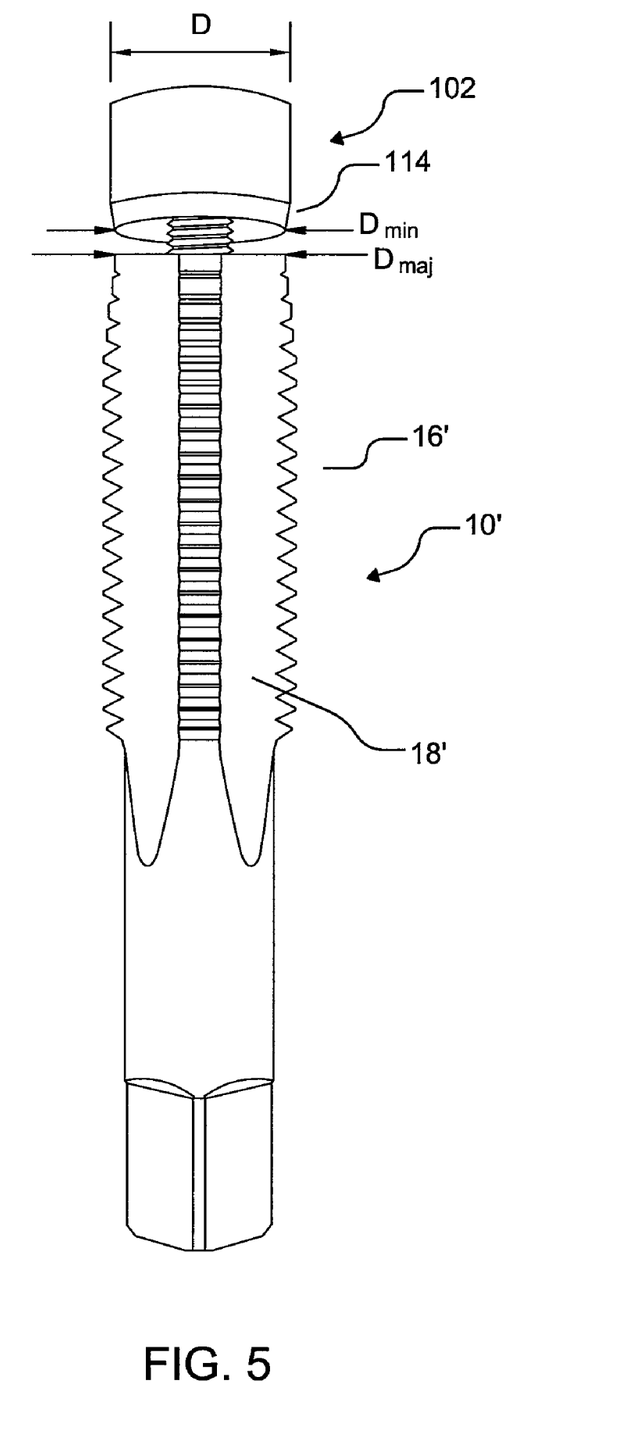
FIG. 5 shows the embodiment of the self-aligning thread tap of FIG. 2 with the detachable guide partially screwed on to the tap member.
Figure 6:
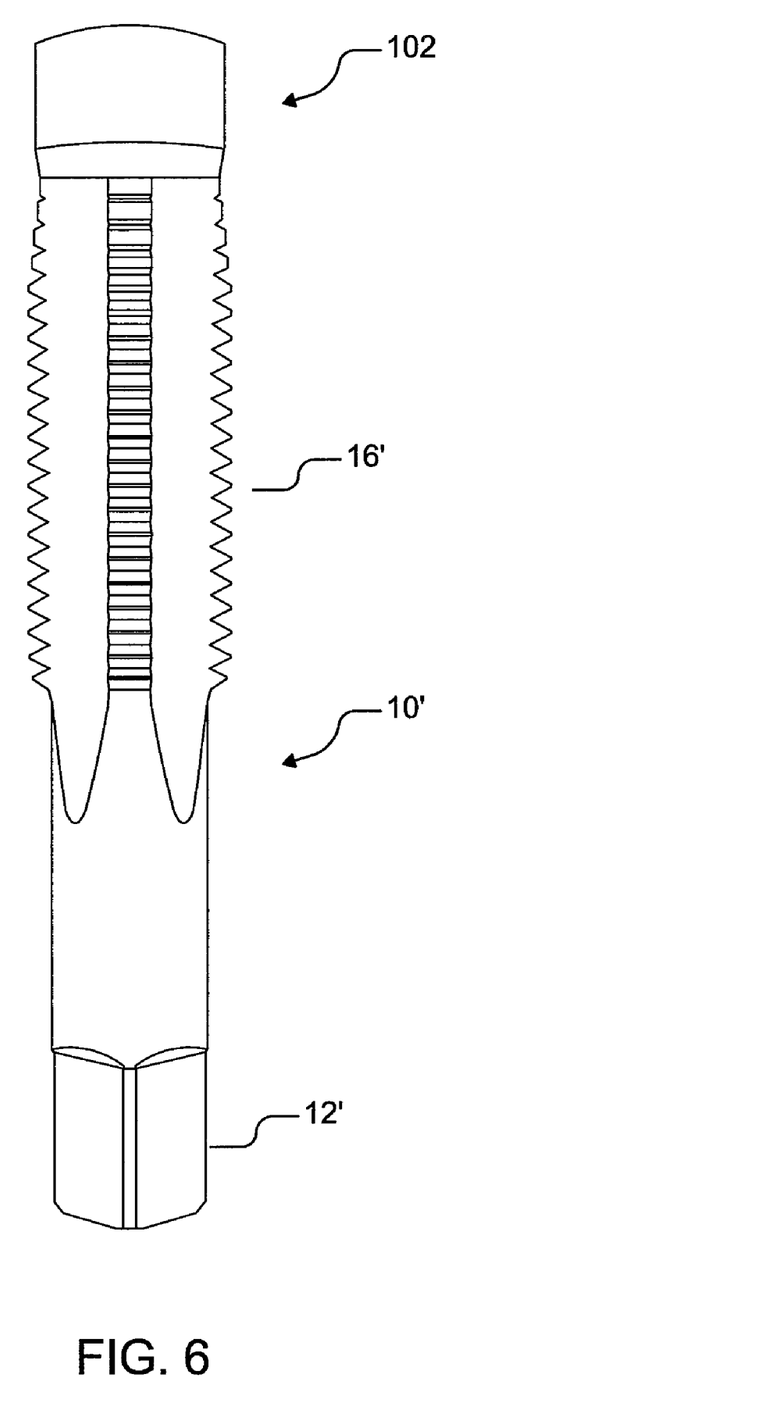
FIG. 6 is a side view of the self-aligning thread tap shown in FIG. 2.

An embodiment of the self-aligning tap 100 comprises a removable pilot 102 and means for attaching and detaching the removable pilot from the terminus 120 of the tap member 10'. The tap member 10' comprises a shank having a first end 12' adapted for engagement by a rotation means, such as a hand tool, and a second end 14' (the "working end") for introduction into a smooth bore of a work piece 1. Between these two ends, the standard tap comprises a threaded portion 16' and fluted shaft portion 18' As best shown in FIG. 3, the threaded portion 16' and fluted shaft portion 18' may comprise a plurality of generally axially aligned and outwardly extending lobe members, where each lobe member has a face comprising cutting threads, wherein each pair of adjacent lobe members is divided by a flute section 18'. The tap member 10' further comprises a shaft terminus 20', which typically is a flat surface perpendicular to the central axis $A_T$ of the shaft of the tap member 10'. The removable pilot 102 may have a substantially cylindrical body having a top 104, a bottom 106, and an exterior portion 108 where the cylindrical body defines a central axis $A_P$. The removable pilot 102 may have a continuous outside diameter D along its entire length L, or the removable pilot may have a tapered diameter as discussed below. The top 104 of the removable pilot 100 may comprise a substantially flat face, except for an embodiment which comprises a threaded stem 110, discussed below, where the threaded stem 110 is centered on the substantially flat face of the top 104.

The removable pilot 102 may comprise tool engagement means to facilitate the attachment of the removable pilot to the tap member 10'. The preferred form of said tool engagement means comprises a recessed broached polygonal-shaped opening 112, in the form of a hexagon, square or other polygonal shape, which is centered on the bottom 106 of the removable pilot 102. The point-to-point dimension and depth of the opening 112 typically equal one-third to one-half of the removable pilot's outside diameter D. The polygonal-shaped opening 112 serves as a receptacle for an Allen key or similar device, which is used to break free the pilot 102 from the tap member 10' after the pilot threads have been formed and the tap removed from the smooth bore. Alternatively, other tool engagement means might be utilized, such as wrench flats or an opening for an adjustable pin spanner wrench.

The top 104 of the removable pilot 102, that is the part that abuts the working end 14' of the tap member 10', features means for attaching the removable pilot 102 to the terminus 20' of the tap member. Said means preferably comprise an integral threaded stem 110, which is centered on the face of the top 104 of the removable pilot 102, where the threaded stem fastens into a threaded bore 50 in the terminus 20' of the tap member 10', where the diameter, length, and thread pitch of the threaded stem 110 are compatible with the threads of the threaded bore 50, where the threaded bore is centered in the terminus 20' of the tap member. The depth and diameter of said threaded bore 50, as well as the pitch of its threads, may depend upon the dimension of the outside diameter of the shaft's flat terminus, where the greater the terminus's outside diameter, the deeper and larger may be the threaded bore, and the coarser its pitch. For reasons that will be made apparent later, the threads of the above-described terminus bore are preferably left-handed threads when the threads of the tap member are right-handed, and right-handed when the tap member's threads are left-handed.

Although the removable pilot 102 is substantially cylindrical, embodiments of the removable pilot may, for functional advantage, comprise a section 114 having a tapered exterior diameter for approximately the upper one-quarter of the exterior of the removable pilot, specifically where the top 104 abuts the terminus 20' of the tap member 10'. Embodiments of the removable pilot 102 may thus be configured such that the minor diameter $D_{min}$ of the tapered removable pilot 102 is equal to the major diameter $D_{maj}$ of the terminus 20', where the major diameter is no more than eight-thousandths of an inch smaller than the diameter of the smooth bore to be tapped. The major diameter $D_{maj}$ of the terminus 20' is defined by the radially extending cutting threads 16' immediately adjacent to the terminus, which threads taper inwardly.

The purpose of the taper section 114 is to reduce any tendency of the removable pilot member 102 to catch on burrs and chips as it is being removed from the smooth bore, after having guided the tap during the production of pilot threads. The taper section 114 serves to push burrs and displaced material back against the sides of the bore so that the pilot may be freely removed. It should be noted that while the preferred form of the removable pilot 102 is generally cylindrical, any polygonal shape with a minimum of five sides of equal length may be suitable. It should also be noted that it is advantageous that the removable pilot 102 be made from hardened steel, or that it be heat treated to a minimum of 40 RC, so that it not be damaged by contact with the smooth bore.

It is noted above that the internal threads of the threaded bore 50 at the terminus 20' of the tap member 10' and the external threads of the threaded stem 110 of the removable pilot 102 shall be left-handed threads when the cutting threads 16' of the tap member 10' are right-handed, and right-handed threads when the cutting threads of the tap member are left-handed. This is so in order that the pilot member 102 not loosen from the tap member 10' as it is withdrawn from the smooth bore 2 of the workpiece 1 after pilot threads 3 have been formed. The formation of pilot threads 3 creates chips, burrs, and some displacement of the wall material of the smooth bore, which may create sufficient friction to cause the pilot member 102 to bind as it and the tap member 10' are rotationally removed from the smooth bore. When the thread direction of the pilot member 102 is opposite that of the thread direction of the cutting threads 16' of the tap member 10', this opposition causes the pilot member 102 to tighten against the terminus 20', ensuring that the pilot member 102 will not loosen or, in the worst case, remain in the bottom of the smooth bore as the tap member 10' is withdrawn.

Figure 7:
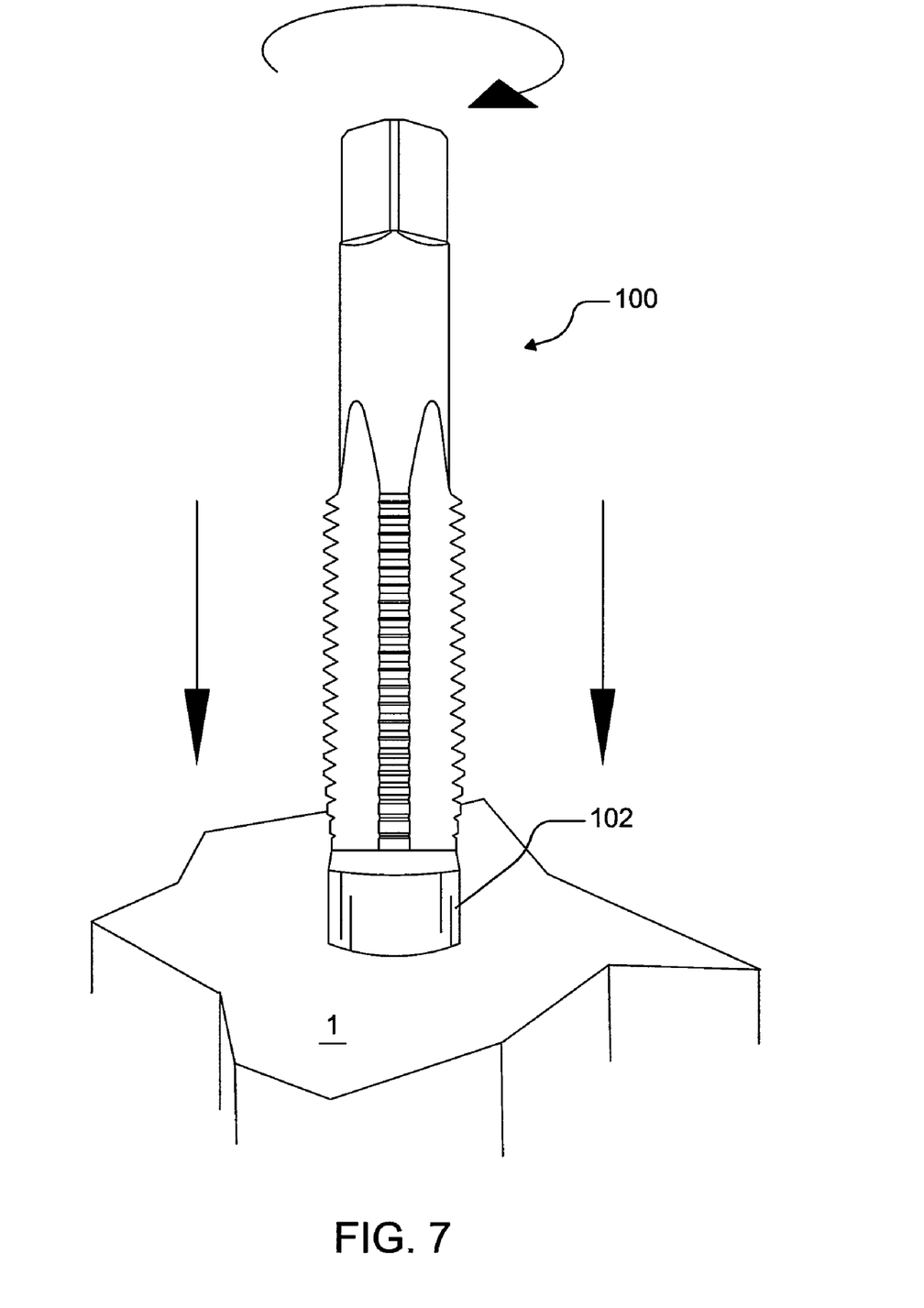
FIG. 7 shows an embodiment of the presently disclosed invention being inserted into the bore of work piece, with the detachable guide installed.
Figure 8:
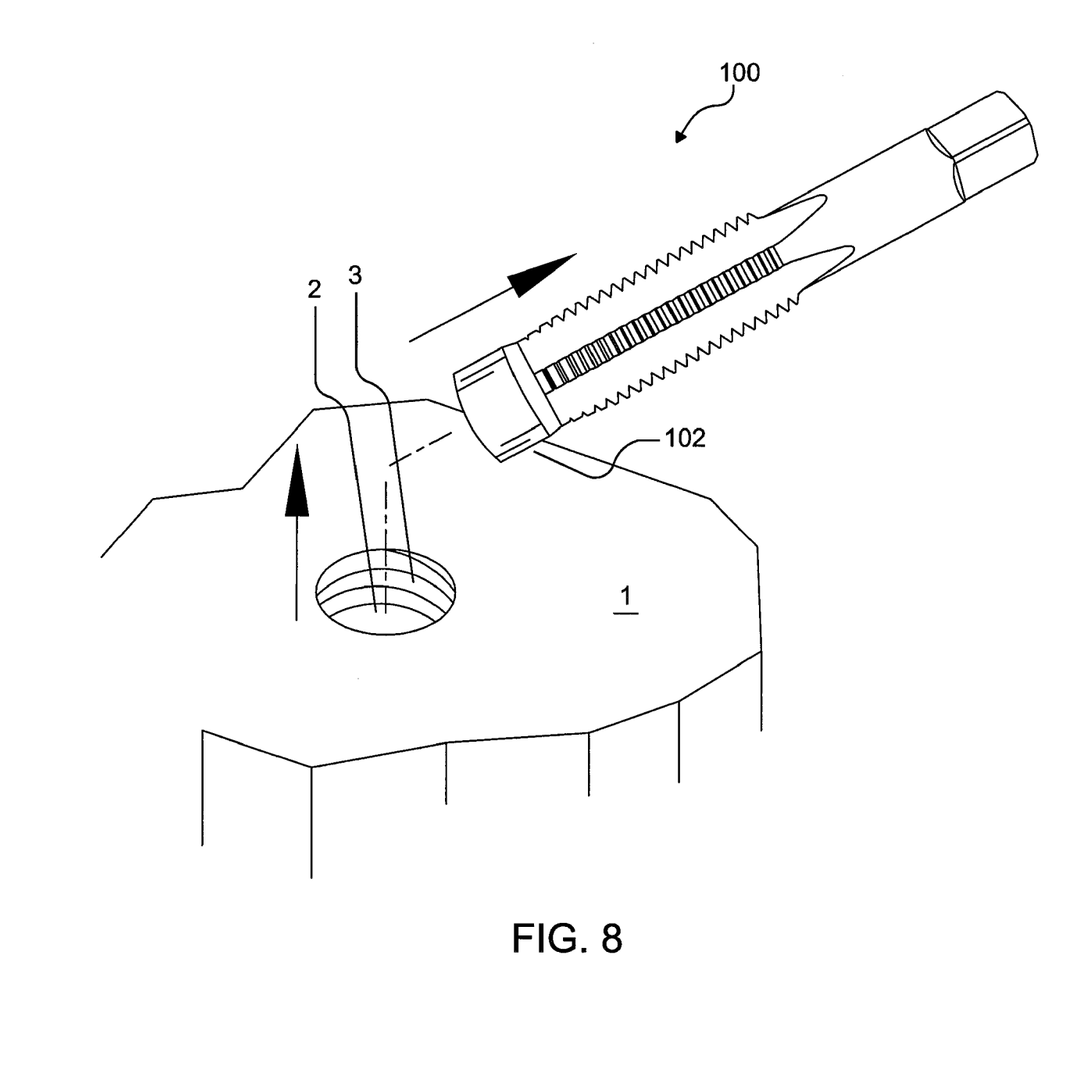
FIG. 8 shows the embodiment of the self-aligning thread tap shown in FIG. 7 being removed having cut several threads in the bore hole of the work piece.
Figure 9:
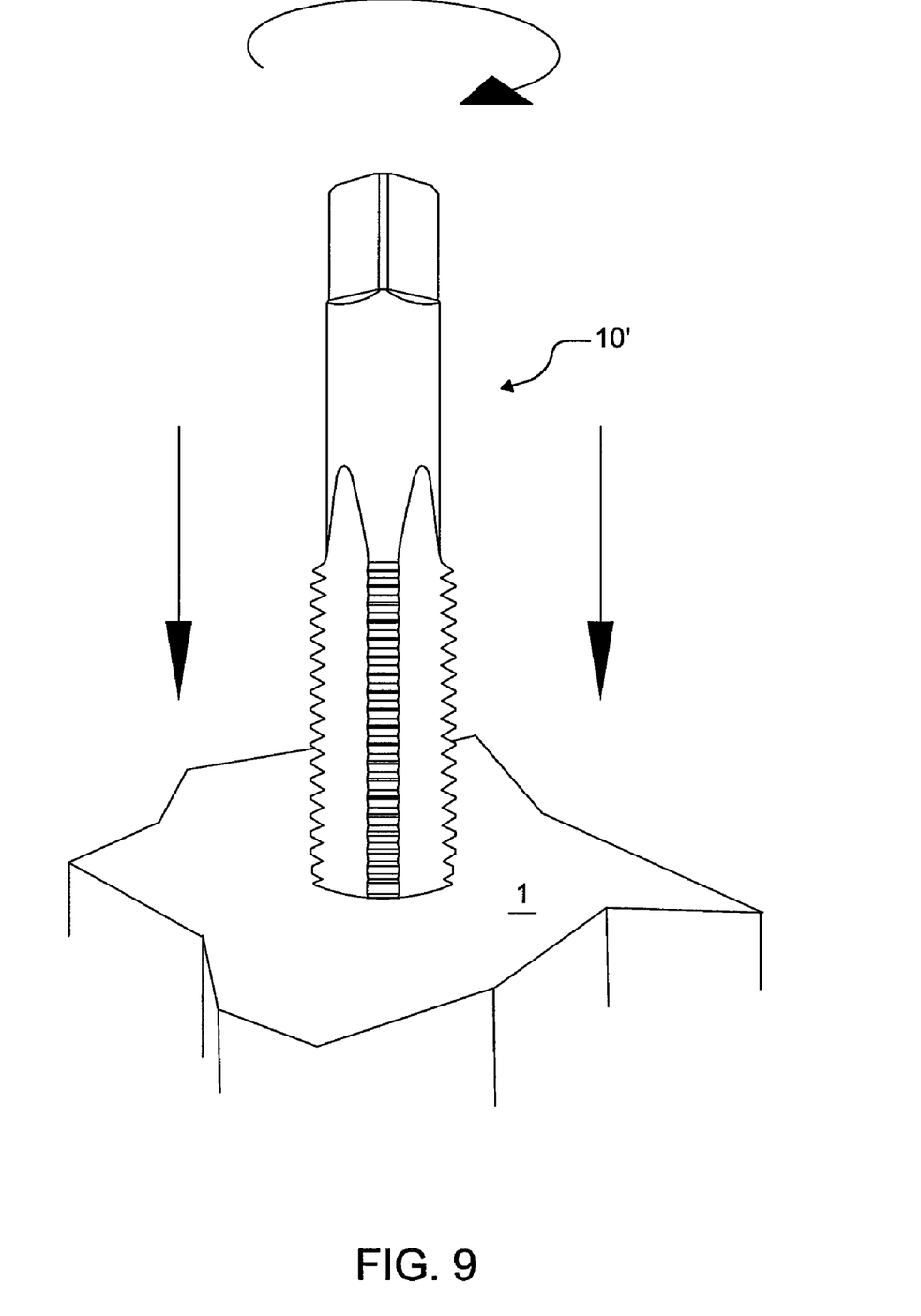
FIG. 9 shows the tap member having been reinserted in the bore hole without the detachable guide to complete the cutting of the threads in the work piece.

A method of tapping threads utilizing embodiments of the disclosed apparatus generally comprise the steps of drilling a smooth bore to create a pilot hole for tapping. A removable pilot 102 with a threaded stem 110 is inserted into a corresponding threaded bore 50 in the terminus 20' of the tap member 10'. The assembled apparatus 100 is then inserted into the smooth bore 2 of a work piece 1 and rotated to form a sufficient number of correctly aligned pilot threads 3, generally three to four pilot threads. The apparatus 100 is then removed by rotating it in the direction opposite its installation. The removable pilot 102 is then removed from the tap member 10', and the tap member is reinserted into the newly formed pilot threads and rotated until the tapping of the smooth bore is completed.

These and other features, aspects, and advantages of the present invention will become better understood with regard to the following description, appended claims, and accompanying drawings. While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. An improvement to a thread tap, the thread tap comprising a shank having a first end adapted for engagement by a rotation means, and a second end for introduction into a smooth bore of a work piece, wherein a longitudinal axis is defined between the first end and the second end, the thread tap further comprising between the first end and the second end a plurality of generally axially aligned and outwardly extending lobe members, each lobe member comprising a face comprising cutting threads, wherein each pair of adjacent lobe members is divided by a flute section, the second end of the thread tap comprising a shaft terminus comprising a flat surface perpendicular to the longitudinal axis, the improvement comprising:
   a removable pilot member comprising a substantially cylindrical body, the removable pilot member comprising a top, a bottom, and an exterior portion, where a central axis is defined by the cylindrical body, the removable pilot member further comprising a threaded stem axially extending from the top of the removable pilot member for attaching the removable pilot member to the thread tap and detaching the removable pilot member to the thread tap, wherein the central axis of the removable pilot member coincides with the longitudinal axis of the thread tap when the removable pilot member is attached to the thread tap; and
   the thread tap comprising a threaded aperture in the shaft terminus for accepting the threaded stem of the removable pilot member;
   wherein the cutting threads have a direction opposite to the direction of the threads of the threaded stem.

2. The improved thread tap of claim 1 where the cutting threads are right-handed threads and the threaded stem and threaded aperture comprise left-handed threads.

3. The improved thread tap of claim 1 where the cutting threads are left-handed threads and the threaded stem and threaded aperture comprise right-handed threads.

4. The improved thread tap of claim 1 wherein the cylindrical body of the removable pilot member comprises tool engagement means to facilitate the attachment of the removable pilot to the thread tap.

5. The improved thread tap of claim 4 wherein the tool engagement means comprises a recessed broached polygonal-shaped opening in the bottom of the removable pilot member.

6. The improved thread tap of claim 5 wherein the polygonal-shaped opening in the bottom of the removable pilot member is hexagonal in shape.

7. The improved thread tap of claim 1 wherein the diameter of the removable pilot member tapers inwardly at the top of the removable pilot member.

8. The improved thread tap of claim 7 wherein the cutting threads of the thread tap taper inwardly towards the terminus, and the diameter of the removable pilot is equivalent to the diameter defined by the cutting threads immediately adjacent to the terminus.

9. A thread tap comprising:
   a tap member comprising a shank having a first end adapted for engagement by a rotation means, and a second end for introduction into a smooth bore of a work piece, wherein a longitudinal axis is defined between the first end and the second end, the tap member further comprising between the first end and the second end a plurality of generally axially aligned and outwardly extending lobe members, each lobe member comprising a face comprising cutting threads, wherein each pair of adjacent lobe members is divided by a flute section, the second end of the tap member comprising a shaft terminus comprising a flat surface perpendicular to the longitudinal axis, the shaft terminus comprising threaded aperture; and
   a removable pilot member comprising a substantially cylindrical body, the removable pilot member comprising a top, a bottom, and an exterior portion, where the a central axis is defined by the cylindrical body, the removable pilot member further comprising a threaded stem axially extending from the top, wherein the central axis of the removable pilot member coincides with the longitudinal axis of the tap member when the removable pilot member is attached to the tap member;
   wherein the cutting threads have a direction opposite to the direction of the threads of the threaded stem.

10. The thread tap of claim 9 where the cutting threads are right-handed threads and the threaded stem and threaded aperture comprise left-handed threads.

11. The thread tap of claim 9 where the cutting threads are left-handed threads and the threaded stem and threaded aperture comprise right-handed threads.

12. The thread tap of claim 9 wherein the cylindrical body of the removable pilot member comprises tool engagement means to facilitate the attachment of the removable pilot to the thread tap.

13. The thread tap of claim 12 wherein the tool engagement means comprises a recessed broached polygonal-shaped opening in the bottom of the removable pilot member.

14. The thread tap of claim 13 wherein the polygonal-shaped opening in the bottom of the removable pilot member is hexagonal in shape.

15. The thread tap of claim 9 wherein the diameter of the removable pilot member tapers inwardly at the top of the removable pilot member.

16. The thread tap of claim 15 wherein the cutting threads of the tap member taper inwardly towards the terminus and the diameter of the removable pilot is equivalent to the diameter defined by the cutting threads immediately adjacent to the terminus.

17. A method of installing threads in a bore hole with the thread tap of claim 9 comprising the steps of:
    attaching the removable pilot member to the tap member;
    inserting the thread tap, pilot member first, into the bore hole;
    rotating the thread tap several turns to cut several threads in the top of the bore hole;
    removing the thread tap from the bore hole;
    removing the removable pilot member from the tap member;
    inserting the tap member into the bore hole;
    rotating the tap member until the desired number of threads are cut into the bore hole; and
    removing the tap member from the bore hole.

18. The method of claim 17 where the cutting threads are right-handed threads and the threaded stem and threaded aperture comprise left-handed threads.

19. The method of claim 17 where the cutting threads are left-handed threads and the threaded stem and threaded aperture comprise right-handed threads.

* * * * *